United States Patent [19]

Baron et al.

[11] Patent Number: 4,515,937

[45] Date of Patent: May 7, 1985

[54] FLAME RESISTANT SULFUR-BEARING COPOLYCARBONATE

[75] Inventors: Arthur L. Baron, New Martinsville, W. Va.; Sivaram Krishnan, Moers, Fed. Rep. of Germany

[73] Assignee: Mobay Chemical Corporation, Pittsburgh, Pa.

[21] Appl. No.: 185,632

[22] Filed: Sep. 9, 1980

[51] Int. Cl.$^3$ .................................. C08G 63/62
[52] U.S. Cl. ............................. 528/204; 528/171; 528/173; 528/174; 528/196; 528/201; 528/203
[58] Field of Search .............. 528/204, 203, 201, 196, 528/171, 173, 174

[56] References Cited

U.S. PATENT DOCUMENTS

| | | | |
|---|---|---|---|
| 3,250,744 | 5/1966 | Schnell et al. | 260/47 |
| 3,250,774 | 5/1966 | Schmidt et al. | 260/250 |
| 3,541,049 | 11/1970 | Cleveland | 260/47 |
| 3,544,514 | 12/1970 | Schnell et al. | 260/47 |
| 3,775,367 | 11/1973 | Nouvertne | 260/45.9 |
| 3,816,373 | 6/1973 | Hoogeboom | 528/204 |
| 3,897,392 | 7/1975 | Haupt et al. | 260/47 XA |
| 3,912,688 | 10/1975 | Schiller et al. | 528/174 |
| 4,001,183 | 1/1977 | Freitag et al. | 260/47 XA |
| 4,043,980 | 8/1977 | Baron et al. | 528/204 |
| 4,093,590 | 6/1978 | Mark | 260/45.85 |
| 4,100,130 | 7/1978 | Freitag et al. | 260/37 PC |
| 4,104,245 | 8/1978 | Mark | 260/45.7 |
| 4,111,977 | 9/1978 | Mark | 260/45.95 R |
| 4,115,354 | 9/1978 | Mark et al. | 260/45.75 |
| 4,153,595 | 5/1979 | Mark | 260/45.75 |
| 4,174,359 | 11/1979 | Sivaramakrishnan et al. | 525/1 |
| 4,185,009 | 1/1980 | Idel et al. | 260/459 R |

OTHER PUBLICATIONS

English Language Translation of German, 2721 595 Offenlegungsschrift.

*Primary Examiner*—Harold D. Anderson
*Attorney, Agent, or Firm*—Gene Harsh; Lawrence Pope; Aron Preis

[57] ABSTRACT

The invention relates to an aromatic, high molecular weight thermoplastic copolycarbonate comprising the reaction product of a sulfur-free aromatic diphenol, a sulfur-containing diphenol, a branching agent and a carbonic acid derivative, characterized in having improved flame resistance. The invention further relates to a process for the preparation of said copolycarbonate.

6 Claims, No Drawings

FLAME RESISTANT SULFUR-BEARING COPOLYCARBONATE

1. FIELD OF THE INVENTION

The invention relates to polycarbonate resins and more particularly to branched thermoplastic, aromatic copolycarbonates having incorporated therein a sulfur moiety, characterized by its improved flame resistance.

2. DESCRIPTION OF THE PRIOR ART

Polycarbonates derived from reactions involving organic dihydroxy compounds and carbonic acid derivatives have found extensive commercial application because of their excellent mechanical and physical properties. These thermoplastic polymers are particularly suited for the manufacture of molded article products for which impact strength, rigidity, toughness, thermal and dimensional stability as well as excellent electrical properties are required.

It has been proposed that flameproofing additives which are known to be suitable for use in other synthetic resins might also be added to high molecular weight thermoplastic polycarbonates in order to further reduce their low combustibility. However, attempts to carry out such a proposal have not been entirely saisfactory, either because the amount of such additives which had to be used in order to get some effect was so large that the valuable properties of the polycarbonates were seriously impaired or because the additives were incompatible with polycarbonates or unstable at the high processing temperatures employed for polycarbonates. Alternatively, therefore, polycarbonates having a reduced combustibility have been produced industrially by incorporating halogen-containing divalent phenols such as tetrachloro- or tetrabromo-bisphenols into the polymer. This solution has not yielded entirely satisfactory results since the high halogen content thus necessitated may have an adverse effect on the polymer and interfere to some extent with the processing of the polymer. Further, upon processing at elevated temperatures the halogen constituent may cause secondary damage (corrosion) to metal parts if present in the form of hydrohalic acids.

Methods aimed at rendering polycarbonates flame resistant have been disclosed in, for example, U.S. Pat. Nos. 3,775,367; 4,093,590; 4,104,245; 4,111,977; 4,115,354 and 4,153,595. Additives as flameproofing agents admixed into the polycarbonate resin tend in most cases to have an adverse effect on at least some of the mechanical properties of the resin.

Addition of sulfur to polycarbonate is taught by U.S. Pat. No. 4,100,130 to promote flame retardance. Residues of sulfonyl diphenol and of halogenated bishydroxyaryls incorporated in its structure are taught in U.S. Pat. No. 3,912,688 to improve the flame resistance of aromatic polycarbonates.

Thiodiphenol based copolycarbonates are taught in U.S. Pat. No. 3,250,744. Impact modification of polycarbonate resulting upon the incorporation therein of thiodiphenol is taught in DOS 2,721,595. U.S. Pat. Nos. 4,043,980 and 4,174,359 both teach enhanced impact performance and flame resistance imparted to polycarbonates upon incorporation of thiodiphenol and halogen on the same polymer backbone or via additives, respectively.

A flame resistant branched polycarbonate product, by Mobay Chemical Corporation, rated V-O 1/16", by UL-94 incorporates flame retardant additives.

Thus, it is an object of the invention to provide a copolycarbonate resin wherein combined are the mechanical properties for which polycarbonates are noted and an improved level of flame resistance.

3. BRIEF DESCRIPTION OF THE INVENTION

A copolycarbonate having improved flame resistance, comprising the branched product of reaction between a carbonic acid derivative and a mixture of a sulfur-free aromatic diol and a sulfur-bearing diphenol is provided. A preferred embodiment, wherein 4,4'-thiodiphenol is employed as the sulfur-bearing diphenol, is additionally characterized by its improved critical thickness.

4. DETAILED DESCRIPTION OF THE INVENTION

The copolycarbonate resins of the invention may be prepared by conventional methods of preparation for polycarbonate resins and may have a weight average molecular weight of 10,000 to 20,000 and preferably a melt flow rate of 1 to 24 gram/10 min. at 300° C. ASTM (1238).

Any suitable processes, reactants, catalysts, solvents, conditions and the like for the production of the copolycarbonate resins of this invention which are customarily employed in polycarbonate resin syntheses may be used such as disclosed in German Pat. Nos. 1,046,311 and 962,274 and U.S. Pat. Nos. 3,248,414; 3,153,008; 3,215,668; 3,187,065; 3,028,365; 2,999,846; 2,964,974; 2,970,137; 2,991,273 and 2,999,835, all incorporated herein by reference. The preferred process is the interfacial polycondensation process.

According to the interfacial polycondensation process, copolycarbonate resins are obtained by reacting the aromatic dihydroxy compounds with an alkali metal hydroxide or alkaline earth metal oxide or hydroxide to form the salt of the hydroxy compounds. The salt mixture is present in an aqueous solution or suspension and is reacted with phosgene, carbonyl bromide or bischloroformic esters of the aromatic dihydroxy compounds. An organic solvent is provided in the reaction admixture which is a solvent for the polymer but not for the aromatic dihydroxy salts. Thus, chlorinated aliphatic hydrocarbons or chlorinated aromatic hydrocarbons are used as the organic solvent which dissolves the condensation product. In order to limit the molecular weight, one may use monofunctional reactants such as monophenols, for example, the propyl-, isopropyl- and butyl-phenols, especially p-tert.-butyl-phenol and phenol itself. In order to accelerate the reaction, catalysts such as tertiary amines, quaternary ammonium, phosphonium or arsonium salts and the like may be used. The reaction temperature should be about $-20°$ to $+150°$ C., preferably 0° C. to about 100° C.

According to the polycondensation process in a homogeneous phase, the dissolved reaction components are polycondensed in an inert solvent in the presence of an equivalent amount of a tertiary amine base required for absorption of the generated HCl, such as, e.g., N,N-dimethyl-aniline, N,N-dimethyl-cyclohexylamine or preferably pyridine and the like. In still another process, a diaryl carbonate can be transesterified with the aromatic dihydroxy compounds to form the polycarbonate resin.

It is to be understood that it is possible to combine in the processes described above in a chemically meaningful way both the aromatic dihydroxy compounds and the monohydroxy compounds in the form of the alkali metal salts and/or bis-haloformic acid esters, and the amount of phosgene or carbonyl bromide then still required in order to obtain high molecular products. Other methods, conditions and reactants of synthesis in forming the polycarbonates of the invention such as disclosed in U.S. Pat. No. 3,912,688, incorporated herein by reference, may be used.

The aromatic sulfur-free diphenols useful in the practice of the invention are those represented by the structural formula

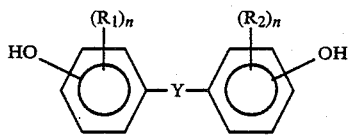

wherein Y is a single bond, an alkylene or alkylidene radical with 1 to 8 carbon atoms, a cycloalkylene or cycloalkylidene radical with 5 to 15 carbon atoms,

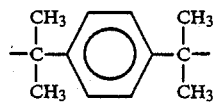

—O—, —CO—, preferably methylene or isopropylidene and $R_1, R_2$ independently denote H or $C_1$-$C_4$ alkyl and n is from 0 to 4.

Suitable aromatic diphenols are, for example, (4,4'-dihydroxy-diphenyl)-methane, (2,2'-dihydroxy-diphenyl)-propane, 1,1-(4,4'-dihydroxy-diphenyl)-cyclohexane, 1,1-(4,4'-dihydroxy-3,3'-dimethyl-diphenyl)-cyclohexane, 1,1-(2,2'-dihydroxy-4,4'-dimethyl-diphenyl)-butane, 2,2-(2,2'-dihydroxy-4,4'-ditert.-butyl-diphenyl)-propane or 1,1'-(4,4'-dihydroxy-diphenyl)-1-phenyl-ethane; futhermore, methane derivatives which carry besides two hydroxyaryl groups, an alkyl residue with at least two carbon atoms and a second alkyl residue with one or more carbon atoms, such as 2,2-(4,4'-dihydroxy-diphenyl)-butane, 2,2-(4,4'-dihydroxy-diphenyl)-pentane, 3,3-(4,4'-dihydroxy-diphenyl)-pentane, 2,2-(4,4'-dihydroxy-diphenyl)-hexane, 3,3-(4,4'-dihydroxy-diphenyl)-hexane, 2,2-(4,4'-dihydroxy-diphenyl)-4-methyl-pentane, 2,2-(4,4'-dihydroxy-diphenyl)-heptane, 4,4-(4,4'-dihydroxy-diphenyl)-heptane (melting point 148°–149° C.) or 2,2-(4,4'-dihydroxy-diphenyl)-tri-decane. Suitable di-(monohydroxyaryl)-alkanes, the two aryl residues of which are different, are, for example, 2,2-(4,4'-dihydroxy-3'-methyl-diphenyl)-propane and 2,2-(4,4'-dihydroxy-3-methyl-3'-isopropyl-diphenyl)-butane. Suitable di-(monohydroxyaryl)-alkanes, the alkyl residue of which, linking the two benzene rings, is substituted by an aryl residue are, for instance, (4,4'-dihydroxy-diphenyl)-phenyl-methane and 1,1-(4,4'-dihydroxy-diphenyl)-1-phenyl-ethane.

Suitable dihydroxybenzenes and substituted, sulfur-free dihydroxy benzenes are hydroquinone, resorcinol, pyrocatechol, and methyl hydroquinone. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846; in German Published Specification Nos. 1,570,703; 2,063,050; 2,063,052; 2,211,956 and 2,211,957; in French Patent Specification No. 1,561,518; and in the monograph, H. Schenell, "Chemistry and Physics of Polycarbonates", Interscience Publishers, New York, 1964. Other suitable dihydroxy aromatic compounds are 4,4'-dihydroxy-diphenylene, 2,2'-dihydroxy-diphenylene, dihydroxy-naphthalene and dihydroxy-anthracene. The suitable dihydroxybenzenes can carry substituents which are not capable of reacting in the conversion into polycarbonate such as halogen atoms or alkyl groups. The preferred embodiment, however, is halogen-free.

The sulfur-containing diphenols useful in the practice of the invention are those represented by the structural formula

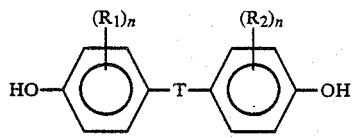

wherein $R_1$ and $R_2$ independently are a lower alkyl selected from a group consisting of methyl, ethyl, propyl and butyl, n is equal to from 0 to 2 and T is either S, SO or $SO_2$. Sulfur-containing diphenols are, in the practice of the invention, introduced into the reaction such that they may constitute at least 15 mol percent, and preferably between 15 and 30 mol percent, relative to the total amount of diphenols.

The branching agents for the copolymers of the invention are the suitable branching agents for polycarbonates known in the art. In theory, any polyhydric phenols having 3 or more, preferably 4, reactive hydroxyl groups may be used in producing branched polymers. Particularly suitable branching agents have proved to be organic compounds in which radicals of monohydric phenols are linked to one another through aliphatic, cycloaliphatic or araliphatic groups or the so-called ortho-esters of carbonic esters or the ortho-esters of monocarboxylic or dicarboxylic acids, especially of aromatic monocarboxylic or dicarboxylic acids such as isophthalic acid or terephthalic acid with dihydric phenols, especially bis-(hydroxy-phenyl)-alkanes of which one phenolic group is esterified.

Examples of suitable branching agents are: 2,2-bis-[4,4-bis-(4-hydroxy-phenyl)-cyclohexyl]-propane; hexa-(4-(2-(4-hydroxy-phenyl)-isopropyl)-phenyl)-ortho-terephthalic acid ester; tetra-(4-hydroxy-phenyl)-methane; and tetra-[4-(dimethyl-4-hydroxy-phenyl)-methyl-phenoxy]-benzene. Other suitable branching agents for the practice of the invention are described in U.S. Pat. Nos. 3,897,392; 4,001,183; 3,544,514 and 3,541,049, all incorporated herein by reference. The preferred branching agent, isatin biscresol, is a member of a class of compounds collectively termed 3,3'-bis-(4-hydroxyaryl)-oxindoles corresponding to the general formula

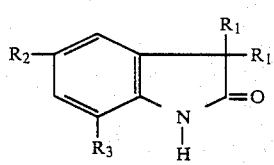

wherein $R_1$ denotes a 4-hydroxyaryl radical and $R_2$ and $R_3$ independently denote hydrogen or halogen; as described in U.S. Pat. No. 4,185,009, incorporated herein by reference.

In the practice of the invention, branching agents may be introduced, in amounts of between 0.05 and 2% relative to the number of mols of the diphenols, in the course of polymerization. Monofunctional compounds, and, in particular monophenols, are introduced into the reaction in order to limit the molecular weight and to prevent cross-linking. Small amounts, preferably between 0.1 and 8 mol percent, relative to the number of mols of dihydroxy compounds, of monophenols may be thus introduced.

The branched copolycarbonates provided by the present invention are thermoplastically processable and are moldable into useful articles by conventional techniques. They are characterized by their improved flame retardance. The preferred embodiment, a copolycarbonate of thiodiphenol, is characterized also by its improved critical thichkness. Critical thickness has been defined as that thickness of a part at which a transition from brittle to ductile impact failure occurs.

The invention will be further illustrated but is not limited by the following Example.

EXAMPLE 564 gm of a (15%) sodium salt solution containing the monomers bisphenol A, monophenols and thiodiphenol is metered into a reactor; prior to entry into this reactor, a dilute solution (1% as an Na salt) isatin biscresol is added to this stream to give a mol percent range of 0.3–0.8. Phosgene (gaseous) is then metered at a rate of 40–42 gm/min. to form the low molecular weight oligomers of this copolymer. Methylene chloride is added to the reaction to maintain a polymer solution having a polymer content of 10–12%. This reaction is carried out maintaining a pH of 12.5–12.8 at a controlled reaction temperature of 25°–30° C. The average reaction time is 10–15 minutes.

After completion of the primary reaction, the reaction is further catalyzed by 0.2–0.4 mol percent of triethylamine while maintaining the pH media at 12.8. The reaction temperature is ambient temperature ($\sim$30° C.) and within 15–20 minutes the reaction has been completed.

Upon completion of the reaction, phase separation is allowed to occur and the polymer phase is washed in a centrifuge to remove electrolytes, residual monomer and catalyst.

The resulting solution is then concentrated to a higher polymer content by a devolatilizing extrusion and pelletized.

The properties of copolycarbonates thus produced are tabulated below and are compared to similarly produced branched homopolymer and unbranched copolymer.

| EXAMPLE | A | B | C | D | E | F | G |
|---|---|---|---|---|---|---|---|
| Reaction Particulars | | | | | | | |
| Wt. % TDP[a] | 25 | 15 | | 0 | 0 | 0 | 25 |
| Mole % IBC[b] | | | 0.5 | 0.8 | 0.8 | 0.8 | 0.3 |
| Product Characteristics | | | | | | | |
| Wt. % TDP | 25 | 15 | | 0 | 0 | 0 | 25 |
| Mole % IBC | | | 0.5 | 0.8 | 0.8 | 0.8 | 0.3 |
| Melt Index[c] | 8.5 | 6.3 | 2.1 | 2.1 | 0.8 | 3.9 | 6.0 |
| Rel. Visc. Pellets[d] | 1.287 | 1.306 | 1.289 | 1.280 | 1.326 | 1.262 | 1.266 |
| Inorganic Chlorides (ppm) | | | | 0 | | | 15 |
| Impact Properties | | | | | | | |
| ⅛" Notched Izod ft.-lb./in. | 13.44 | 14.78 | 14.88 | 12.37 | 11.91 | 12.39 | 12.8 |
| J/m | 715.9 | 788.8 | 794.3 | 660.3 | 635.9 | 661.7 | 683.5 |
| ¼" Notched Izod ft.-lb./in. | 13.31 | 14.34–4.13 (50%)[g] | 2.64 | 2.04 | 3.9 | 1.75 | 2.79 |
| J/m | 710.3 | 765.5–220.3 | 140.9 | 108.9 | 208.5 | 93.7 | 148.9 |
| Critical Thickness[e] | | | | | | | |
| Mils | >264 | 252 | 175 | 183 | 175 | 145 | 205 |
| mm | >6.71 | 6.4 | 4.44 | 4.7 | | | |
| UL Flame Properties[f] | | | | | | | |
| ⅛" Spec. Rating | 20% V-0 60% V-1 20% V-2 | Fails V-2 | V-0 100% | Fails V-2 | V-0 80% V-1 20% | V-0 80% V-2 20% | V-0 100% |
| Average Burn Time | 4.6 | | 3.0 | | 2.6 | 3.9 | 1.7 |
| 1/16" Spec. Rating | Fails V-2 | Fails V-2 | 20% V-0 20% V-2 60% fails V-2 | Fails V-2 | V-0 20% V-1 20% V-2 60% | V-2 100% | V-2 100% |
| Average Burn Time (sec.) | | | 6.0 | | 16.3 | 9.4 | |

| EXAMPLE | H | I | J | K | L | M | N |
|---|---|---|---|---|---|---|---|
| Reaction Particulars | | | | | | | |
| Wt. % TDP[a] | 25 | 25 | 25 | 25 | 15 | 15 | 15 |
| Mole % IBC[b] | 0.3 | 0.3 | 0.5 | 0.8 | 0.5 | 0.5 | 0.5 |

-continued

| Product Characteristics | | | | | | | |
|---|---|---|---|---|---|---|---|
| Wt. % TDP | 25 | 25 | 25 | 25 | 15 | 15 | 15 |
| Mole % IBC | 0.3 | 0.3 | 0.5 | 0.8 | 0.5 | 0.5 | 0.5 |
| Melt Index[c] | 3.7 | 2.4 | 2.2 | 2.1 | 1.0 | 2.1 | 4.6 |
| Rel. Visc. Pellets[d] | 1.276 | 1.323 | 1.295 | 1.303 | 1.326 | 1.301 | 1.264 |
| Inorganic Chlorides (ppm) | 1 | 41/36 | 240/246 | 207 | 30 | 20 | 26 |
| Impact Properties | | | | | | | |
| ⅛" Notched Izod ft.-lb./in. | 12.47 | 14.24 | 12.8 | 12.06 | 11.75 | 13.1 | 11.86 |
| J/m | 665.8 | 760.4 | 683.5 | 643.9 | 627.6 | 699.2 | 632.3 |
| ¼" Notched Izod ft.-lb./in. | 3.5/ 12.5 (33%)[g] | 4.5/ 13.1 (67%)[g] | 2.79 | 2.52 | 2.78 | 2.72 | 2.26 |
| J/m | 184–669 | 241–698 | 148.9 | 134.8 | 148.5 | 145.0 | 118.8 |
| Critical Thickness[e] | | | | | | | |
| Mils | 230 | 260+ | 205 | 190 | 220 | 189 | 187 |
| mm | | | | | | | |
| UL Flame Properties[f] | | | | | | | |
| ⅛" Spec. Rating | V-0 40% V-1 20% V-2 40% | V-0 100% | V-0 100% | V-0 100% | | V-0 100% | V-0 100% |
| Average Burn Time | 7.9 | 1.7 | 1.9 | 1.9 | | 3.5 | |
| 1/16" Spec. Rating | V-2 100% | V-0 60% V-2 40% | V-0 100% | V-0 100% | V-0 100% | V-0 20% V-2 80% | V-0 80% V-1 20% |
| Average Burn Time (sec.) | 13.7 | 4.6 | 2.2 | 1.6 | 1.6 | 6.3 | 3.7 |

[a]4,4'-thiodiphenol
[b]Isatin Biscresol
[c]ASTM D-1238 at 300° C.
[d]Measured in a solution of 0.5 gm of the polymer in 100 ml methylene chloride at 25° C.
[e]Mobay's method
[f]UL-94 classification
[g]The number in parenthesis denotes the proportion of the specimens failed in a ductile mold The inorganic chlorides content of these samples are not considered to be of material effect on the flame retardance of these resins.

It is to be understood that any of the components and conditions mentioned as suitable herein can be substituted for its counterparts in the Example and that the details provided herein are solely for the purpose of illustration. Variations can be made by those skilled in the art without departing from the spirit and scope of the invention except as it may be limited by the claims.

What is claimed is:

1. An aromatic high molecular weight copolycarbonate comprising the polymeric reaction product of solely
   (i) an aromatic sulfur-free diphenol represented by the structural formula

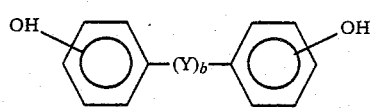

wherein b is zero or 1, Y denotes an alkylene or alkylidene radical with 1 to 7 carbon atoms, a cycloalkylene or cycloalkylidene radical with 5 to 12 carbon atoms, —O— or —CO—;
   (ii) a sulfur-containing diphenol represented by the formula

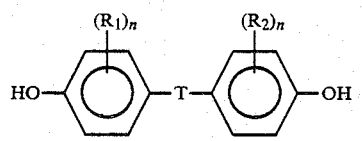

wherein $R_1$ and $R_2$ independently denote a lower alkyl selected from a group consisting of methyl, ethyl, propyl and butyl; n is equal to from 0 to 2 and T is either S, SO or $SO_2$;
   (iii) a branching agent for polycarbonates;
   (iv) a monophenol; and
   (v) a carbonic acid derivative selected from a group consisting of phosgene, carbonyl bromide or bis-chloroformic esters of an aromatic dihydroxy compound;

characterized in that said branching agent comprises between 0.05 and 2%, relative to the molar sum of said (i) plus said (ii) and in that said copolycarbonate comprises at least 15 mol percent of said (ii) and in that they are classified V-O for 1/16" class specimens as evaluated by the procedure of Underwriter's Laboratories Bulletin 94.

2. The aromatic high molecular weight copolycarbonate of claim 1, wherein said aromatic diphenol is 2,2-bis-(4-hydroxy-phenyl)-propane.

3. The aromatic high molecular weight copolycarbonate of claim 1, wherein said sulfur-containing diphenol is 4,4'-thiodiphenol.

4. The aromatic high molecular weight copolycarbonate of claim 1, wherein said branching agent is represented by the general formula

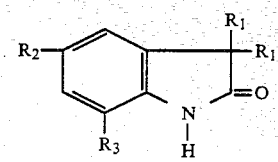

wherein $R_1$ denotes a 4-hydroxyaryl radical and $R_2$ and $R_3$ independently denote hydrogen or halogen.

5. The aromatic high molecular weight copolycarbonate of claim 4, wherein said branching agent is isatin biscresol.

6. The aromatic high molecular weight copolycarbonate of claim 1 or claim 5, wherein said sulfur-containing diphenol comprises between 15 and 30 mol percent relative to the number of mols of diphenols.

* * * * *